United States Patent [19]

Dahms

[11] 4,043,970

[45] Aug. 23, 1977

[54] RESOLE RESIN BINDER COMPOSITION

[75] Inventor: Ronald H. Dahms, Springfield, Mass.

[73] Assignee: Monsanto Company, St. Louis, Mo.

[21] Appl. No.: 634,395

[22] Filed: Nov. 24, 1975

[51] Int. Cl.² .......................... C08L 61/10; C08G 8/10
[52] U.S. Cl. ................... 260/29.3; 260/53 R;
260/59 R; 428/436; 428/443; 428/526; 428/531
[58] Field of Search ........... 260/29.3, 59 R, DIG. 25,
260/45.75 R, 45.75 G, 45.75 M, 45.75 W, 53 R,
57 R

[56] References Cited

U.S. PATENT DOCUMENTS

| | | | |
|---|---|---|---|
| 3,300,430 | 1/1967 | Armour et al. | 260/29.6 |
| 3,332,911 | 7/1967 | Huck | 260/57 |
| 3,422,068 | 1/1969 | Kreibich | 260/52 |
| 3,476,707 | 11/1969 | Culbertson et al. | 260/57 |

*Primary Examiner*—Theodore E. Pertilla
*Attorney, Agent, or Firm*—Joseph S. Nelson; William J. Farrington; James C. Logomasini

[57] ABSTRACT

The invention relates to a resin binder composition comprising, in combination, a resole resin and a metal salt curing accelerator providing a binder composition that has an improved cure rate in electrical grade laminates without adversely affecting electrical properties. The binder composition provides low viscosity for impregnation and accelerated curing rates for advancing the impregnated substrate prior to laminating and final curing.

12 Claims, No Drawings

RESOLE RESIN BINDER COMPOSITION

BACKGROUND OF THE INVENTION

Processing speed is important, in industrial laminating and other applications for cost considerations and energy conservation. In industrial laminating, the substrate, e.g., paper, is drawn through a dip tank containing a phenol-formaldehyde resole resin binder solution, then drawn continuously through a heated oven to remove most of the volatile material and advance the resin somewhat. The faster the rates the more efficient the binder and process, providing great utility.

Several ways to improve processing speed are known. One is to increase the molecular weight of the resin and the other is to use higher solids resin. Both methods suffer because of penetration problems into the substrate, leading to poorer final laminate appearance and greater water absorption which also gives poorer electrical properties. Generally, a low viscosity resin solution and/or low molecular weight resin is desired for substrate penetration and the molecular weight of the resin is raised during the heating step. Increasing the molecular weight in the impregnated substrate prepreg is needed so that when the prepreg layup is cured under heat and pressure, excessive resin flow out of the layup is not encountered.

It has now been discovered that a low viscosity binder composition comprising a resole resin and a metal salt curing accelerator will provide rapid impregnation of substrates with rapid advancement during drying so that during lamination and curing, excessive resin flow from the laminate is not experienced. It has been further discovered that the particular metal salt curing accelerators provide accelerated curing rates without adversely affecting electrical properties.

SUMMARY OF THE INVENTION

This invention is directed to binder compositions comprising a low viscosity resole resin and a metal salt curing accelerator, said salt being soluble in said resole resin, having a metal ion selected from the group consisting of barium ($Ba^{++}$), magnesium ($Mg^{++}$), manganese ($Mn^{++}$), chromium ($Cr^{+++}$), zinc ($Zn^{++}$), aluminum ($Al^{+++}$), dibasic aluminum $Al(OH)_{2+}$, cobalt ($Co^{++}$) and mixtures thereof and having an organic acid salt radical selected from the group consisting of formate, acetate, propionate, benzoate, lactate and mixtures thereof.

DETAILS OF THE INVENTION

Metal Salt Accelerators

The accelerators employed in the composition of the present invention are metal salts. By the term "salt" is meant a compound in which the metal is ionically bonded to the salt radical. It is believed that the curing action of the metal salt resides in the metal ion. The salt radical contributes to the function of the metal ion in allowing such to become soluble in the composition. Hence, the salt radical is selected such that the metal salt is soluble, which is defined for the purposes of the present invention as being soluble in curing concentrations in the binder composition.

The preferred salt radicals are carboxylates of organic acids such as formic, acetic, propionic, benzoate, lactate and mixtures thereof. The preferred metal ions are barium ($Ba^{++}$), magnesium ($Mg^{++}$), manganese ($Mn^{++}$), chromium ($Cr^{+++}$), zinc ($Zn^{++}$), aluminum ($Al^{+++}$), aluminum dihydrate $Al(OH)^{+}_2$ and cobalt ($Co^{++}$) and mixtures thereof.

The metal salt curing accelerators are added to the low viscosity liquid resoles by conventional stirring so as to blend them into the resole to form the binder composition. The metal salt accelerator is added in amounts of from about 0.5 to 5 parts, preferably 1 to 3 parts, by weight per 100 parts of resole resin solids.

RESOLE RESINS

The phenol-formaldehyde resole resins of the present invention are prepared from a phenol selected from the group consisting of phenol, substituted phenols and substituted phenol mixtures and mixtures thereof.

The substituted phenols useful in the resins of this invention are all phenols that have at least one reactive position open in the ortho or para position. Phenol and such substituted phenols or their mixtures can be used. Substituted phenols include all phenols having at least one attached radical selected from the group consisting of alkyl, aryl, cycloalkyl, alkenyl, cycloalkenyl, alkaryl, aralkyl, carbocyclic, halogen and mixtures thereof.

Examples of substituted phenols include: phenols substituted with straight and branched chain alkyl radicals having 1 to 16 carbon atoms, e.g., cresol, isopropylphenol, 2,3-xylenol, 3,5-xylenol, 3,4-xylenol, 2,6-xylenol, mono and disubstituted butyl, amyl, octyl, nonyl, decyl and dodecyl phenols; arly substituted phenols, e.g., phenyl phenol and naphthyl phenol; cycloalkyl phenols, e.g., terphenylphenols, e.g., using limonene, pinene, methadiene, cyclohexyl and cyclopentyl; cycloalkenyl phenols, e.g., cyclopentenyl, dicyclopentadieneyl and methacyclopentadieneyl phenols; alkenyl phenols, e.g., allylphenol, styrene, butenylphenol, pentenyl phenol, hexenylphenol; alkaryl phenols, e.g., tolylphenol, xylylphenol, propylphenylphenol; aralkyl phenols, e.g., benzyl, phenethyl, alphamethyl, phenyethyl, indyl and cumyl phenols bisphenol A, bisphenol F, halophenols, e.g., chlorophenols, bromophenols, 2,4 dichlorophenol, 2,6,dichlorophenol, etc.

The substituted phenol mixture used to make such resin is prepared by reacting phenol under Friedel-Crafts conditions with a controlled mixture of carbocyclic compounds. The mixture of carbocyclic compounds comprises (on a 100 weight percent basis when in a form substantially free of other materials):

A. From about 10 through 40 weight percent of compounds each molecule of which has:
 1. the indene nucleus,
 2. from 9 through 13 carbon atoms,
 3. as nuclear substituents from 0 through 4 methyl groups, B. From about 5 through 70 weight percent of compounds each molecule of which has:
 1. the dicyclopentadiene nucleus,
 2. from about 10 through 13 carbon atoms,
 3. as nuclear substituents from 0 through 3 methyl groups, C. From about 15 through 65 weight percent of compounds each molecule of which has:
 1. a phenyl group substituted by a vinylidene group,
 2. from about 8 through 13 carbon atoms,
 3. as substituents from 0 through 3 groups selected from the class consisting of methyl and ethyl, D. From about 0 through 5 weight percent divinyl benzene;

E. Provided that the sum total of all such compounds in any given such mixture of carbocyclic compounds is always 100 weight percent.

Such substituted phenol mixtures and the resole resins prepared therefrom can be prepared by methods disclosed in U.S. Pat. No. 3,761,448.

In general to produce a resole for use in this invention, a phenol, as just described, is neutralized under aqueous liquid phase conditions as by the addition of base (ammonium hydroxide and/or amine), and then from about 1.0 to 3.0 mols of formaldehyde per one mol of phenol (preferably from about 1.2 to 2.0 mols formaldehyde per mol of phenol) is mixed with the substituted phenol product (now itself a starting material). Water may be added with the formaldehyde. Formalin is preferred as a source for formaldehyde. Also, a basic catalyst material, such as ammonium hydroxide and/or amine selected from the group consisting of primary amines (such as ethylamine, isobutylamine, ethanol amine, cyclohexylamine, and the like); secondary amines (such as diethanol amine, piperidine, morpholine, and the like; and tertiary amines (such as hexamethylene tetramine, triethylamine, triethanolamine, diethyl cyclohexyl amine, triisobutyl amine; and the like) is introduced into the reaction mixture. Preferred amine catalysts have molecular weights below about 300 and more preferably below about 200. The amine catalyst may include hydroxyl groups which tend to promote solubility of the amine in the reaction mixture. This basic catalyst itself thus can be used to neutralize the starting substituted phenol. The pH of this reaction mixture is maintained from (7.0 and preferably above about 7.5) but below about 8.5. This reaction mixture is then heated to temperatures of from about 60° to 100° C., for a time sufficient to substantially react most of the formaldehyde and thereby produce a desired resole product. Times of from about 20 to 140 minutes are typical. Aqueous liquid phase preparation conditions are used.

It will be appreciated that the formaldehyde to phenol mol ratios herein described have reference to the total amount of phenol present before a reaction, including the phenol which is substituted by the carbocyclic compound mixture, as described above.

To optimize electrical properties in resoles used in this invention, it is preferred to use as a basic catalyst, when reacting such substituted phenols with formaldehyde to make resole resins, one which is non-ionic and non-metallic in character.

The resole product produced by reacting the substituted phenol with formaldehyde as described above is one composed of methylolated substituted phenol which has been methylolated by the formaldehyde to a desired methylol content and optionally advanced (e.g., the molecular weight of the methylolated substituted phenol increased) as by heating as necessary or desirable to make a resole resin product having molecular weight characteristics as above indicated. As those skilled in the art fully appreciate, the methylol content and the degree of advancement are readily controllable, so that one can optimize such a resole resin for use in a particular application. For purposes of this invention, a phenol-formaldehyde resole resin or resole can be regarded as being the reaction product of the above-described phenol and formaldehyde under the aqueous base catalyzed conditions as described herein which product can be thermoset by heat alone without the use of a curing catalyst.

In general, such a resole product as made is a brown colored, unstable, multiphase aqueous emulsion whose viscosity depends, in any given instance, upon process and reactant variables, but which usually ranges from a syrupy liquid to a semisolid state. Such a resole product usually separates from such aqueous phase as a brown colored material whose viscosity varies from a syrup to a solid.

To recover the resole resin of this invention such an emulsion is dehydrated, preferably under heat and reduced pressure, to a water content of from about 0.5 to 35 weight percent (based on total resole weight). When the resulting water content is over about 2 weight percent, there is produced a single-phased, clear dark-colored, high solids, resole resin. In any given instance, its total solids content, (residual) water content, and viscosity depend upon the amount of phenol aldehyde product present, the mol ratio of formaldehyde to phenol, specific type and amount of methylolation catalyst, conditions and reactants used to substitute the phenol, methylolation temperature, degree of advancement, and the like.

These resoles are characteristically dark colored, onephase, clear liquid solutions, each having a viscosity ranging from about 5 to 5000 centipoises. The exact viscosity of a given varnish depends upon many chemical process and product variables. For impregnating applications, viscosities of from about 50 to 700 centipoises are preferred.

The total solids content of a given resole can be as high as about 85 weight percent or even higher, and as low as about 20 weight percent or even lower, but preferred solids contents usually fall in the range of from about 25 to 75 weight percent. Solids are conveniently measured using the ASTM Test Procedure D-115-55. As those skilled in the art will appreciate the resoles of this invention can be advanced (e.g., crosslinked as by heating to produce larger molecules) to a greater extent without forming precipitates from the organic solvent phase than is the case of corresponding aqueous resole products.

When used for impregnation and reinforcing purposes, the binder compositions of this invention are useful for impregnating cellulosic paper, asbestos paper, and other non-woven sheet structures as well as woven fabrics (cotton, glass, fibers, nylon, etc.), etc. Impregnation can be accomplished by any convenient means, including dipping, coating, spraying, mixing, or the like. The so-impregnated material is dried to lower the volatiles content and then heated to advance the resin to the proper degree for the intended use. The binder compositions of this invention are useful in the preparation of laminates, such as those made from such impregnated sheet materials. Such laminates are used in electrical applications as supports or as insulation for conductive elements. The laminates are generally manufactured in a sheet or block form which is then punched or otherwise machined to provide desired configuration for a particular end use.

The binder compositions of this invention are also useful in the manufacture of cloth laminates and automotive oil filters. A suitable oil filter media, for example, is prepared by impregnating with a binder composition of this invention, cellulosic fiber paper modified with a synthetic fiber (polyester, or the like) and having a thickness of from about 5 to 20 mils. Sufficient of the binder composition of this invention is used to obtain an impregnated sheet member having a cured resin content of about 15 to 25 percent, based on the weight of the paper. After such paper is so impregnated, it is heated to advance the resole resin to a so-called B-stage, and then is corrugated or pleated to form the filter element. The filter element is then assembled with the end use filter container and heated to 250° F. to 350° F., for from 5 to 20 minutes to cure the resin. When cured, the product has good flexibility and low tendency to crack during use.

Binder Compositions

The binder composition has, in combination, a resole resin comprising resin solids of from 20 to 85 percent, preferably 25 to 75 percent, by weight, a dissolved water content of 0.5 to 35 percent, preferably 2.0 to 15 percent by weight based on said resole resins solids, said resole having a viscosity of from about 5 to 5000 cps preferably 50 to 700 cps, said composition having present from about 0.5 to 5 parts, preferably 1 to 3 parts of a metal salt based on said resole resin solids.

The binder composition can be a solution wherein said resole resin and accelerator are contained in a solution comprising about 20 to 98 percent, preferably 25 to 75 percent by weight of resin solids, about 2 to 80 percent, preferably 25 to 75 percent by weight water and about 0.5 to 5 parts preferably 1 to 3 parts of a metal salt based on said resin solids.

The binder composition can be a solution or varnish wherein said resole resin and accelerator are contained in a solution comprising:
A. about 20 to 85 percent by weight of resole resin solids,
B. about 0.5 to 15 percent by weight of water,
C. about 0.5 to 5 parts by weight accelerator per 100 parts of resole resin solids, and
D. the balance up to 100 percent by weight of said solution being an organic liquid which
  1. is substantially inert to said resin and water,
  2. evaporates below about 150° C., at atmospheric pressures,
  3. is a mutual solvent for said resin, said water and said accelerator, being present in an amount sufficient to maintain a solution.

The organic liquid is a relatively volatile, inert organic solvent medium having the properties described above. While the organic liquid used has properties as indicated above, it will be appreciated that such liquid can comprise mixtures of different organic liquids. Preferred liquids are lower alkanols (such as ethanol and methanol) and lower alkanones (such as acetone or methyl ethyl ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonane, octane, petroleum fractions, etc. Preferably, the total water content of a solution of the invention is below about 15 weight percent, and more preferably falls in the range of from about 0.5 to 5 weight percent.

Those skilled in the art will appreciate that care should preferably be taken to use an organic liquid system in which the phenolic resole resins are completely soluble as well as any water present. Adding, for example, a ketone or an ether-ester solvent like butyl Cellosolve will generally improve the water tolerance (ability to dissolve water) of a solvent system.

EMBODIMENTS

The following examples are set forth to illustrate more clearly the principles and practices of the invention to one skilled in the art. They are not intended to be restrictive but merely to be illustrative of the invention. Unless otherwise stated herein, all parts and percentages are by weight.

EXAMPLES 1 - 8

Unsubstituted phenolic resoles of lower molecular weight are cured by the metal catalysts of this invention. The resin used was made by the following procedure:

Phenol (100 parts), 50 percent formalin (95 parts) and triethylamine (4 parts) were refluxed at 70° C., to a free formaldehyde of less than 4 percent. The resin was then dehydrated to 80 percent solids. The resin viscosity was 660 centipoises and contained 7 percent water.

The metal salts were mixed and dissolved in the resole resin forming the binder composition of the present invention. Several salt compounds were evaluated to determine the effects of the cations and anions on curing such compositions. The various compounds were tested for their effect on pH and "dry rubber" properties and are shown in Table I. The "dry rubber" test for testing curing rates is commonly used by those skilled in the art. The composition is spread over a hot surface such as hot plate at a controlled temperature desired for drying and curing. A spatula is used to spread and work the composition. When the composition loses its tackiness and does not form viscous membranes on withdrawal of the spatula the composition is considered cured to the "dry rubber" state. The test is used to determine how many seconds to cure to a "dry rubber" state, hence, the cure rate of the composition. This is particularly relevant to advancing and accelerating the cure of the composition in the impregnated substrate during drying the composition prior to laminating. Accelerated rates are desirable to increase the drying and curing rates of the low viscosity fast penetrating binder compositions of the present invention.

TABLE I

| Example | Salts in parts/100 parts of Resole Solids | Salt Compounds | pH | Dry Rubber Time at 150° C. in Seconds |
| --- | --- | --- | --- | --- |
| 1 | 0 | 0 | 8.2 | 285 |
| 2 | 2 | Cu(OAc)$_2$ | 7.2 | 284 |
| 3 | 2 | Ni(OAc)$_2$ | 7.9 | 244 |
| 4 | 4 | NH$_4$OAc | 6.4 | 240 |
| 5 | 2 | Cr(OAc)$_3$ | 7.6 | 184 |
| 6 | 2 | Mg(OAc)$_2$ | 8.1 | 150 |
| 7 | 2 | Al(OH)$_2$OAc | 7.4 | 150 |
| 8 | 2 | Zn(OAc)$_2$ | 7.7 | 140 |

It is evident from Examples (5–8) that the metal salts of the present invention have an unexpected accelerating action that gives high cure rates without lowering the pH materially providing stable binder compositions.

EXAMPLE 9

Alkylated Resole-Alcohol Solution

Charge 100 parts of phenol and 0.3 part sulfuric acid to a reaction vessel and heat to 50° C. Add 30 parts of a carbocyclic compound mixture described above to the phenol mixture over 30 minutes. Then add 2 parts of hexamethylene-tetramine and 2 parts of triethylamine, after which 83 parts of 50 percent formalin are added. This reaction mixture is heated at 100° C., for 75 minutes, then the mixture dehydrated under vacuum until the temperature rises to 60° C., at 28 inches of mercury. Add 74 parts methanol to obtain a resin solution in alcohol. The solids content was 59 percent and the viscosity 150 centipoises.

EXAMPLES 10 – 22

The resole solution of Example 9 was formulated using a variety of metal compounds to determine their curing effect as determined by the "dry rubber test". In each case 100 parts of the resole resin solids were used with the indicated metal compounds.

TABLE II

| Example | Metal* Compound | Dry Rubber 135° (sec.) |
|---|---|---|
| 10 | 0 | 162 |
| 11 | $Zn(OH)_2$ | 150 |
| 12 | $Tl(OAc)_2$ | 137 |
| 13 | $Ni(OAc)_2$ | 131 |
| 14 | $Ca(OAc)_2$ | 125 |
| 15 | $Na(OAc)$ | 117 |
| 16 | $Ba(OAc)_2$ | 105 |
| 17 | $Mg(OAc)_2$ | 100 |
| 18 | $Mn(OAc)_2$ | 97 |
| 19 | $Cr(OAc)_3$ | 88 |
| 20 | $Zn(OAc)_2$ | 85 |
| 21 | $Al(OH)_2(OAc)$ | 81 |
| 22 | $Co(OAc)_2$ | 75 |

*1 part of compound per 100 parts of resole solids.

It is evident from the table that in those Examples (16–22), wherein the preferred salts of the present invention are used, that the cure rate is accelerated to the highest degree. It was found that the $Zn(OH)_2$ compound was not soluble in the binder composition in sufficient amounts to increase the curing rate materially. This was found to be true of such compounds as CuO, PbO, $Pb_3O_4$, $PbO_2$, $Pb(OAc)_4$, MgO, $MnO_2$ and $Cu(OAc)_2$, which were not found to be effective in curing binder compositions.

EXAMPLES 23 – 27

The resole resin solution of Example 9 was formulated with metal salts. 1 part of the metal salts listed below were added and stirred to dissolve. Nine parts of methanol were added to reduce the solids to 55 percent (Solution A). The metal salts used were zinc acetate, dibasic aluminum acetate, chromium acetate, calcium acetate and sodium acetate. A control containing no metal salt was included for comparison. Test laminates were made from the solutions of (A) and 10 mil electrical grade cotton linters paper. Seven plies of the paper were impregnated to a resin content of 56 percent with the resin solutions of (A). The impregnated papers were dried in an oven at 135° C. and the times noted to reach a flow of ca. 6 percent. The seven plies of dried impregnated paper are assembled into a deck and cured for 30 minutes at 150° C., under a pressure of 1000 psi to form a laminate about one-sixteenth inch thick. The laminates were tested with the data shown in Table III. The calcium and sodium acetate containing resins cured in the same lengths of time as the control indicating their ineffectiveness as cure accelerators. The metal salts of the present invention cured in one-third less time showing their effectiveness as curing accelerators. These same 3 metal salts also had acceptable electrical properties evidenced by the dielectric constant and dissipation factor results.

TABLE III

| Examples | 23 | 24 | 25 | 26 | 27 | 28 |
|---|---|---|---|---|---|---|
| Metal Salt | 0 | zinc acetate | aluminum acetate | chromium acetate | calcium acetate | sodium acetate |
| Resin Content (wgt. %) | 54 | 56 | 56 | 55 | 56 | 56 |
| flow, %[1] minutes at 135° C. | 6 | 10 | 7 | 4 | 6 | 7 |
| (B-staging)[2] dry rubber at 135° C. | 3½ | 2½ | 2½ | 2½ | 3½ | 3½ |
| (sec.)[3] Water absorption, % | 162 | 85 | 81 | 88 | 125 | 117 |
| D24/23** Dielectric Constant | 1.0 | 1.1 | 0.8 | 1.0 | 0.9 | 1.0 |
| Cond. A at $10^6$ cps* | 5.2 | 5.1 | 5.2 | 5.1 | 5.0 | 5.3 |
| Cond. D24/23 Dissipation Factor | 5.4 | 5.4 | 5.3 | 5.5 | 5.5 | 6.0 |
| Cond. A at $10^6$ cps* | .043 | .047 | .045 | .047 | .046 | .080 |
| Cond. D24/23** | .046 | .053 | .049 | .055 | .059 | .122 |
| Color | brown | reddish brown | brown | dark brown | brown | brown |

*cycles per second
**D24/23 sample soaked in $H_2O$ 24 hours and 23° C.
[1]flow-wgt. % of composition flowing from laminate
[2]B-staging-time in minutes before laminating
[3]dry rubber-time in seconds for composition to cure to dry rubber

EXAMPLE 29

Alkylated Resole-Water Solution

Charge 100 parts of phenol and 0.3 part sulfuric acid to a reactor and heat to 50° C. Add 20 parts styrene to the phenol mixture over 20 minutes. Then add 4 parts triethylamine and 80 parts 50 percent formalin. The reaction mixture is heated for four hours at 70° C., and then dehydrated under vacuum to a solids of 75 percent. The viscosity is 460 centipoises and it contains 7 percent water. The various cure accelerators claimed are dissolved in this resin solution.

More dilute versions can be formulated, e.g., 36 parts of water can be added to 100 parts of the above resin to provide 55 percent solids resin in water. The metal salt curing accelerators can be added and laminates made of these solutions.

What is claimed is:
1. A binder composition comprising a low viscosity resole resin and a metal salt curing accelerator, said salt being soluble in said resole resin, having a metal ion selected from the group consisting of barium (Ba++), magnesium (Mg++), manganese (Mn++), chromium (Cr+++), zinc (Zn++), aluminum (Al+++), dibasic aluminum Al(OH)+₂, cobalt (Co++) and mixtures thereof and having an organic acid salt radical selected from the group consisting of formate, acetate, propionate, benzoate, lactate and mixtures thereof said metal salt being present in from about 0.5 to 5 parts based on 100 parts of resole resin solids.

2. A binder composition of claim 1, said resole resin comprising the reaction product of formaldehyde and a phenol, said phenol selected from the group of phenol, substituted phenols, substituted phenol mixture and mixtures thereof in a mol ratio 1.0 to 3.0, reacted in the presence of a basic catalyst.

3. A binder composition of claim 2, wherein said substituted phenol mixture has been prepared by alkylation of phenol with a mixture of carbocyclic compounds under acid conditions at a temperature in the range of 25° to 200° C., whereby 10 to 80 parts by weight of the mixture of carbocyclic compounds reacts with 100 parts by weight of phenol, said mixture of carbocyclic compounds comprising:
  A. from 10 to 40 parts by weight of compounds each molecule of which has:
    1. the indene nucleus,
    2. from 9 to 13 carbon atoms,
    3. as nuclear substituents from 0 to 4 methyl groups;
  B. from 5 to 70 parts by weight of compounds each molecule of which has:
    1. the dicyclopentadiene nucleus,
    2. from 10 to 13 carbon atoms,
    3. as nuclear substituents from 0 to 3 methyl groups,
  C. from 15 to 65 parts by weight of compounds each molecule of which has:
    1. a phenyl group substituted by a vinylidene group,
    2. from 8 to 13 carbon atoms,
    3. as substituents from 0 to 3 groups selected from the class consisting of methyl and ethyl; and
  D. from 0 5 parts by weight of divinyl benzene.

4. A binder composition of claim 2, wherein said phenol is phenol.

5. A binder composition of claim 2, wherein said phenol is a substituted phenol having at least one radical selected from the group consisting of alkyl, aryl, cycloalkyl, alkenyl, cycloalkenyl, alkaryl, aralkyl, carbocyclic, halogen and mixtures thereof.

6. A binder composition of claim 1, wherein said resole resin comprises a solids content of from about 20 to 85 percent, a water content of from about 2 to 35 percent by weight based on said resole resin, a viscosity of from about 5 to 5000 cps, said metal salt being present in from about 0.5 to 5 parts based on 100 parts of resole resin solids.

7. A binder composition of claim 2, wherein said basic catalyst is selected from the group consisting of ammonium hydroxide, hexamethylene tetramine and triethylamine.

8. A binder composition of claim 2, wherein said metal salt is zinc acetate.

9. A binder composition of claim 2, wherein said metal salt is cobalt acetate.

10. A binder composition of claim 1, wherein said metal salt is aluminum dihydroxy acetate.

11. A binder composition of claim 1, wherein said resole resin and accelerator are contained in a solution comprising about 20 to 98 percent by weight resole resin solids, about 2 to 80 percent by weight water and about 0.5 to 5 parts by weight accelerator per 100 parts of resole resin solids.

12. A binder composition of claim 1, wherein said resole resin and accelerator are contained in a solution comprising:
  A. about 20 to 85 percent by weight of resole resin solids,
  B. about 0.5 to 15 percent by weight of water,
  C. about 0.5 to 5 parts by weight accelerator per 100 parts of resole resin solids, and
  D. the balance up to 100 percent by weight of said solution being an organic liquid which
    1. is substantially inert to said resin and water,
    2. evaporates below about 150° C., at atmospheric pressures,
    3. is a mutual solvent for said resin, said water and said accelerator, being present in an amount sufficient to maintain a solution.

* * * * *